(12) United States Patent
Jeng et al.

(10) Patent No.: US 8,060,547 B2
(45) Date of Patent: Nov. 15, 2011

(54) PADE APPROXIMATION CONVERT CIRCUIT OF DIRECT DIGITAL FREQUENCY SYNTHESIZER

(75) Inventors: Shiann Shiun Jeng, Hualien (TW); Hsing Chen Lin, Hualien (TW); Wei Li Tou, Hualien (TW); Pao Kuei Horng, Taoyuan County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 1036 days.

(21) Appl. No.: 11/979,964

(22) Filed: Nov. 13, 2007

(65) Prior Publication Data
US 2009/0125576 A1    May 14, 2009

(51) Int. Cl.
*G06F 1/02* (2006.01)
(52) U.S. Cl. ...................................... 708/271; 708/276

(58) Field of Classification Search .................. 708/271, 708/176, 276
See application file for complete search history.

(56) References Cited

U.S. PATENT DOCUMENTS

| 7,398,173 | B2* | 7/2008 | Laraia et al. | 702/99 |
| 2006/0085728 | A1* | 4/2006 | Lestable | 714/794 |

* cited by examiner

*Primary Examiner* — Chuong D Ngo
(74) *Attorney, Agent, or Firm* — Rosenberg, Klein & Lee

(57) ABSTRACT

This invention relates to Pade approximation convert circuit of the direct digital frequency synthesizer in which a multiplier receives and multiplies a first input signal and a variable signal so as to produce a multiplication signal; a divider receives and divides a second input signal and a variable signal so as to produce a division signal; an adder receives and adds the multiplication signal and the division signal so as to generate an output signal, that is then returned back to the divider. A quarter period of a sinusoidal wave signal is completed by the proceeding of direct calculation two times such that the time for the calculation of a complete sinusoidal wave can be saved and the area of the calculation circuit can be reduced.

11 Claims, 3 Drawing Sheets

PADE APPROXIMATION CONVERT CIRCUIT OF DIRECT DIGITAL FREQUENCY SYNTHESIZER

BACKGROUND OF THE INVENTION

1. Field of the Invention

This invention relates to a phase-to-sinusoid amplitude convert (PSAC) of the direct digital frequency synthesizer, particularly to a convert circuit of the direct digital frequency synthesizer using Pade approximation algorithm for converting phase into a quarter period of sinusoidal wave signal.

2. Brief Description of the Prior Art

Generally, a phase accumulator 10' and a phase-to-sinusoid amplitude converter 20' are used in the so-called direct digital frequency synthesis (hereinafter expressed as DDFS) to generate required digitized signal, and then a digital to analog converter (DAC) is used to convert the digitized signal into analog waveform. In FIG. 1, a conventional direct digital frequency synthesizer is shown, which includes a phase accumulator 10', a phase-to-sinusoid amplitude converter 20' and a DAC 30'. The phase accumulator 10' of the direct digital frequency synthesizer receives a digital signal and outputs it to the phase-to-sinusoid amplitude converter 20'. Thus an corresponding output signal is generated. The digital signal is converted into analog signal by the DAC 30'. The analog signal served as the output of the DAC 30' can be smoothed by a low pass filter (not shown) so as to generate a periodic signal such as a sinusoidal wave.

Inasmuch as the DDFS has the advantages of high resolution, speedy frequency switching, continuous linear variation of phase, low cost and simple structure, DDFS has been widespread utilized in digital communication system. So far, Taylor polynomial and CORDIC algorithm are used as the direct calculation algorithm of the DDFS. It is relatively easy to realize the DDFS by sinusoidal approximation calculation with direct expanding of Taylor polynomial. The phase input is operated by continuous multiplication calculation and sinusoidal wave symmetry property configuration to generate a complete sinusoidal wave signal. Further, CORDIC algorithm is a method to calculate the sine and cosine values corresponding to the input phase by the trigonometric function property, in which the sine and cosine values corresponding to all rotation phases after addition and subtraction are calculated by multiplication, addition and shift. In addition, using the property of fixing the rotation angle at $\arctan(2^{-r})$ all the time, a multiplier is replaced by a shifter. Thus a complete sinusoidal wave signal is generated by the sinusoidal wave symmetry property.

However, in the sinusoidal wave approximation calculation by direct expanding of Taylor polynomial, realization of a quarter period of a sine wave from the phase input has to calculate eight-time continuous multiplication. Thus, the calculation is relatively time-consuming and the circuit area required for this calculation is large. Furthermore, the frequency of rotation iterative calculation is influenced by the selection of initial angle and rotation angle in CORDIC algorithm, thus the calculation of corresponding amplitude according to the input angle is relatively time-consuming and the frequency of rotation iterative calculation is too high. Therefore, the realization of a complete sinusoidal wave is relatively time-consuming.

Thus, if a new direct digital frequency synthesizer is proposed to cope with the above problems, not only the time for the calculation of a complete sinusoidal wave can be saved, but also the circuit area can be reduced so as to save the cost. Accordingly, the above problems can be solved.

SUMMARY OF THE INVENTION

One object of this invention is to provide a Pade approximation convert circuit of the direct digital frequency synthesizer, which can save the time for the calculation of a complete sinusoidal wave by Pade approximation algorithm.

Another object of this invention is to provide a Pade approximation convert circuit of a direct digital frequency synthesizer, which can save the time for the calculation of a quarter period of a sinusoidal wave amplitude by Pade approximation algorithm so as to reduce the circuit area.

The Pade approximation convert circuit of the direct digital frequency synthesizer of the present invention has a convert circuit by using Pade approximation algorithm, which includes a multiplier, a divider and an adder. The multiplier receives and multiplies a first input signal and a variable signal so as to produce a multiplication signal. The divider receives and divides the variable signal and a second input signal so as to produce a division signal. The adder receives and adds the multiplication signal and the division signal so as to generate an output signal, that is then returned back to the divider, such that a quarter period of a sinusoidal wave signal is obtained. Furthermore, a first MSB and a second MSB are used to recover a quarter period of the sinusoidal wave signal to a complete sinusoidal wave signal.

Next, the Pade approximation convert circuit further comprises a plurality of multiplexers in cooperation with a selective signal respectively, then input signal sequentially inputs to the multiplier and the divider so as to complete a quarter period of a sinusoidal wave signal.

BRIEF DESCRIPTION OF THE ACCOMPANYING DRAWINGS

DETAILED DESCRIPTION OF THE PREFERRED EMBODIMENTS

The present invention will be further described in detail by specific preferred embodiments in conjunction with the accompanying drawings.

Figure 1:
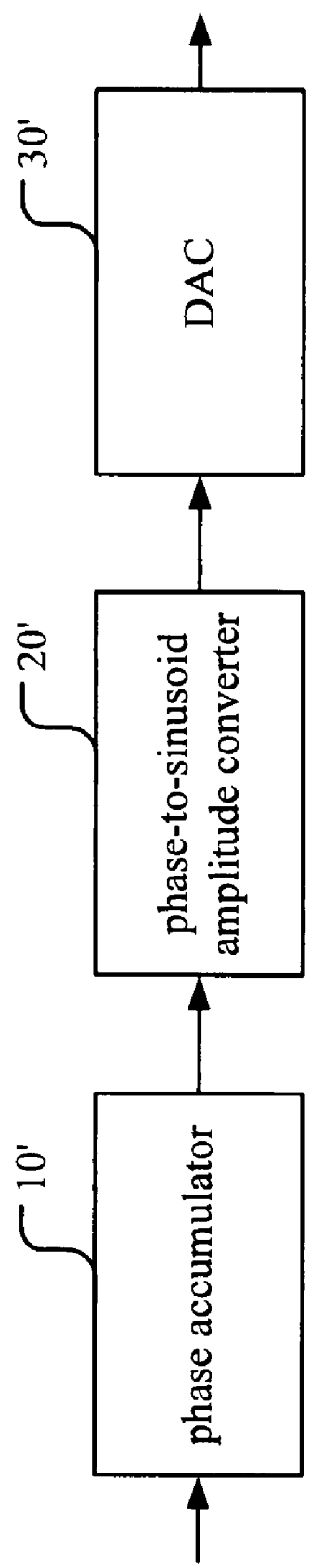
FIG. 1 is the direct digital frequency synthesizer of a prior art.
Figure 2:
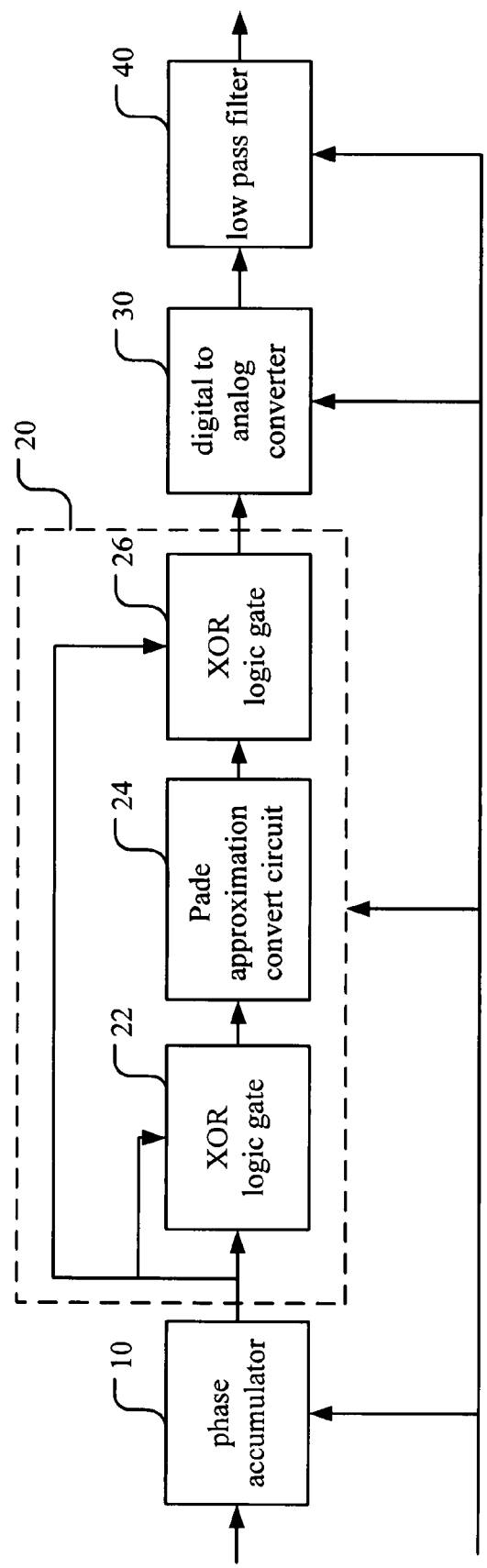
FIG. 2 is a block diagram of a preferred embodiment of the direct digital frequency synthesizer of the present invention.

Referring to FIG. 2, a block diagram of a preferred embodiment of the direct digital frequency synthesizer of the present invention is shown. As shown in the Figure, the direct digital frequency synthesizer of the present invention comprises a phase accumulator 10, a phase-to-sinusoid amplitude converter 20, a digital to analog converter (hereinafter expressed as DAC) 30 and a low pass filter 40. The phase accumulator 10 receives a N-bits input signal so as to generate a M-bits phase accumulating signal, and the signal is transmitted to the phase-to-sinusoid amplitude converter 20 so as to convert the phase accumulating signal into a digital sinusoidal wave signal. Then the digital sinusoidal wave signal is converted into an analog sinusoidal wave signal by the DAC 30. The noise of the sinusoidal wave signal is filtered by low pass filter 40 so that the sinusoidal wave signal is smoothed. An output signal of the output frequency $f_{OUT}$ is synthesized according to a clock signal $f_{CLK}$ among the phase accumulator 10, the phase-to-sinusoid amplitude converter 20, the DAC 30 and the low pass filter 40. Next, the phase-to-sinusoid amplitude converter 20 further includes a XOR logic gate 22, a Pade approximation convert circuit 24 and a XOR logic gate 26. The XOR logic gate 22 receives the M−2 bits phase accumulating signals and the $2^{nd}$ MSB accumulating signal so as to map the ramp signal of the phase accumulating signals, such that a trigonometric wave signal is generated. The Pade approximation convert circuit 24 converts the trigonometric wave signal to produce periodic half sine-wave signal. The XOR logic gate 26 receives the periodic half sine-wave signal and the $1^{st}$ MSB accumulating signal so as to map the half sine-wave signal, therefore a complete sine wave signal is generated. The phase accumulating signals except the $1^{st}$ MSB accumulating signal and the $2^{nd}$ MSB accumulating signal are transmitted to the Pade approximation convert circuit 24 so as to convert a quarter period of sine wave signal to a complete period of sine wave signal.

As stated above, the Pade approximation convert circuit 24 is designed by using Pade approximation algorithm in which the analysis will be shown as follow. First, assume $$A(x) = \sum_{j=0}^{\infty} a_j x^j$$

is a Taylor polynomial, where $$a_n = \frac{1}{n!} A^{(n)}(x)$$

is the $n^{th}$ order coefficient of the Taylor polynomial and n is an positive integer. The Pade approximation objective function is $$\frac{P_L(x)}{Q_M(x)},$$

in which the numerator portion $P_L(x) = p_0 + p_1 x + \ldots + p_L x^L$ is a polynomial of order L and the denominator portion $Q_M(x) = 1 + q_1 x + \ldots + q_M x^M$ is a polynomial of order M. Let the Pade approximation objective function is equivalent to the Taylor polynomial as $$A(x) - \frac{P_L(x)}{Q_M(x)} = 0.$$

Therefore the following relations is established.

$$a_0 = p_0 \quad (1)$$
$$a_1 + a_0 q_1 = p_1$$
$$a_2 + a_1 q_1 + a_0 q_2 = p_2$$
$$\vdots$$
$$a_L + a_{L-1} q_1 + \cdots + a_0 q_L = p_L$$

-continued
$$a_{L+1} + a_L q_1 + \cdots + a_{L-M+1} q_M = 0$$
$$a_{L+M} + a_{L+M-1} q_1 + \cdots + a_L q_M = 0$$

In order to produce a quarter period of a sine wave, the Taylor polynomial of 5-order is approximated as:

$$A(x) = \sin(x) \approx x - \frac{1}{3!} x^3 + \frac{1}{5!} x^5 \quad (2)$$

From the relations of equations (1) and (2), the following relations among the coefficients can be obtained.

$$\because a_0 = a_2 = a_4 = 0, a_1 = 1, a_3 = -\frac{1}{6}, a_5 = \frac{1}{120} \quad (3)$$
$$\therefore q_1 = q_3 = 0, q_2 = \frac{1}{20}, p_0 = p_2 = p_4 = 0, p_1 = 1, p_3 = -\frac{7}{60}$$

Thus, the Pade approximation objective function is:

$$\frac{P_L(x)}{Q_M(x)} = \frac{-\frac{7}{60} x^3 + x}{1 + \frac{x^2}{20}} \quad (4)$$

Then, the Pade approximation objective function is simplified as a continued fraction $$-\frac{7}{3} x + \frac{200}{3x + \frac{60}{x}}.$$

This architecture needs only a multiplier, an adder and a divider to enable the synthesis of a quarter period of a sine wave.

Figure 3:
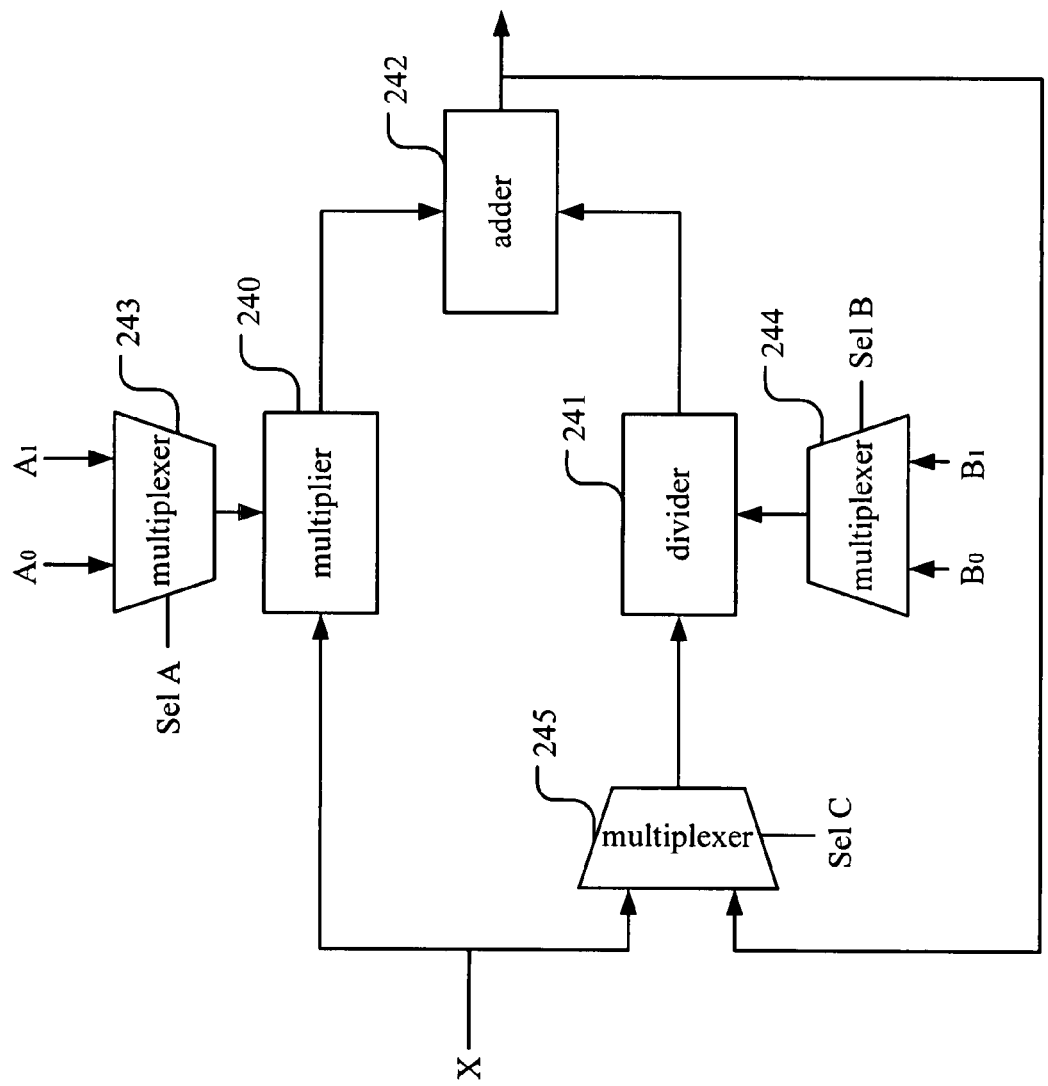
FIG. 3 is a block diagram of a preferred embodiment of the Pade approximation convert circuit of the direct digital frequency synthesizer of the present invention.

Referring to FIG. 3, a block diagram of a preferred embodiment of the Pade approximation convert circuit of the direct digital frequency synthesizer of the present invention is shown. As shown in the Figure, the Pade approximation convert circuit 24 is designed by the continued fraction $$-\frac{7}{3} x + \frac{200}{3x + \frac{60}{x}}$$

derived from the above Pade approximation algorithm, which includes a multiplier 240, a divider 241 and a adder 242. First, the multiplier 240 receives and multiplies a first input signal $A_0$ and a variable signal so as to produce a first multiplication signal, in which the variable signal is a phase accumulating signal, i.e., the ramp signal. The divider 241 receives and divides a variable signal and a second input signal $B_0$ so as to produce a second division signal. The adder 242 receives and adds the multiplication signal and the division signal so as to generate a first output signal. The values of first input signal $A_0$ and the second input signal $B_0$ are respectively 3 and 60, so that the first output of the Pade approximation convert circuit 24 is $$3X + \frac{60}{X},$$

which is then returned back to the divider 241. At this time, the multiplier 240 receives a new first input signal $A_1$ which is multiplied by the variable signal so as to produce a second multiplication signal. The divider 244 receives the first output signal which is divided by the second input signal $B_1$ so as to generate a second division signal. The adder 242 adds the second multiplication signal and the second division signal together so as to produce a second output signal. The values of the first input signal $A_1$ and the second input signal $B_1$ are respectively $$-\frac{7}{3}$$

and 200. The Pade approximation convert circuit 24, after calculating directly two times, generates the second output signal which is the continued fraction $$-\frac{7}{3}x + \frac{200}{3x + \frac{60}{x}}.$$

Therefore, this invention calculates directly by means of Pade approximation algorithm to synthesize a sinusoidal wave, so that the calculation speed can be accelerated. Furthermore, the calculation can be finished by only one multiplier, one divider and one adder such that the circuit area is small and the cost is reduced.

In addition, the Pade approximation convert circuit 24 has to calculate directly two times so as to obtain the required output signal. The multiplier 240 and the divider 241 must input different input signal according to different times of calculations. For this reason, the Pade approximation convert circuit 24 of the present invention has several multiplexers, which are a first multiplexer 243, a second multiplexer 244 and a third multiplexer 245 respectively. The first multiplexer 243 receives a plurality of first input signals $A_0$, $A_1$ and outputs one of the first input signals according to a first selective signal Sel A. The second multiplexer 244 receives a plurality of second input signals $B_0$, $B_1$ and outputs one of the second input signals according to a second selective signal Sel B. The third multiplexer 245 receives the variable signal and the first output signal, and outputs one of the variable signal and the first output signal according to a third selective signal Sel C. When the Pade approximation convert circuit 24 proceeds first operation, the first multiplexer 243, the second multiplexer 244 and the third multiplexer 245 select the first input signals $A_0$, the second input signals $B_0$, and the variable signal respectively according to the respective first selective signal, the second selective signal and the third selective signal. After the first operation, the first output signal is produced. When the Pade approximation convert circuit 24 proceeds second operation, the first multiplexer 243, the second multiplexer 244 and the third multiplexer 245 select the first input signals $A_1$, the second input signals $B_1$, and the first output signal respectively according to the respective first selective signal, the second selective signal and the third selective signal. After the second operation, the second output signal is produced.

Next, the error criterion in the sinusoidal wave signal outputted by the Pade approximation convert circuit 24 of the present invention is divided into integral error criterion and differential error criterion which are used to judge the correlated properties of the error between the sinusoidal wave and the Pade approximation objective function. In the integral error criterion, the analysis of the whole error on the effectiveness can be shown by the formula (5).

$$E(x) = \int_0^{\frac{\pi}{2}} \sin(x) - \left(-\frac{7}{3}x + \frac{200}{\frac{60}{x} + 3x}\right) dx \quad (5)$$

$$= \int_0^{\frac{\pi}{2}} \sin(x) - \left(-\frac{7}{3}x + \frac{200x}{60 + 3x^2}\right) dx$$

$$= 8.63 \times 10^{-4}$$

While in the differential error criterion, the analysis of the maximum error on the effectiveness can be shown by formula (6).

$$\because e'(x) = \frac{d}{dx}\left[\sin(x) - \left(-\frac{7}{3}x + \frac{200}{\frac{60}{x} + 3x}\right)\right] \geq 0 \quad (6)$$

$$\therefore x = \frac{\pi}{2}$$

$$\Rightarrow e\left(\frac{\pi}{2}\right) = 0.0042$$

Apparently from the expressions of (5) and (6), the error between a quarter period of the sinusoidal wave and the Pade approximation objective function is extremely small. Therefore, the sinusoidal wave synthesized by the Pade approximation algorithm of the present invention in cooperation with the sinusoidal wave symmetry property is not only quick in calculation speed, but also the circuit area and error are small.

Based on foregoing, the Pade approximation convert circuit 24 of the direct digital frequency synthesizer of the present invention is a convert circuit by using Pade approximation algorithm, in which a multiplier receives and multiplies a first input signal and a variable signal so as to produce a multiplication signal; a divider receives and divides a second input signal and variable signal so as to produce a division signal; an adder receives and adds the multiplication signal and the division signal so as to generate an output signal which is then returned back to the divider. In this manner, such calculations are proceeded two times so as to finish a quarter period of a sinusoidal wave. Accordingly, the time required for calculating a complete sinusoidal wave, and thus the area of the calculation circuit can be saved.

Summing up above, the present invention is novel, obvious and available in industry, and thus is in conformity with the requirement for a patent, and a patent application is hereby submitted. It is also noted that the abovementioned preferred embodiment is purely for the convenience of description only, not intended to be restrictive on the scope of the present invention. Any modifications and variations or the equivalents developed without departing from the spirit and principle of the present invention is considered to be still within the scope of the present invention.

What is claimed is:

1. A Pade approximation convert circuit used in a direct digital frequency synthesizer, comprising:
   a multiplier, receiving and multiplying a first input signal and a variable signal so as to produce a multiplication signal;
   a divider, receiving and dividing a second input signal and a variable signal so as to produce a division signal; and
   an adder, receiving and adding the multiplication signal and the division signal so as to generate an output signal which is then returned back to said divider.

2. A Pade approximation convert circuit as claimed in claim 1, wherein said Pade approximation convert circuit converts the signal into a quarter period of a sinusoidal wave signal.

3. A Pade approximation convert circuit as claimed in claim 1, further comprising a multiplexer for receiving a plurality of said first input signals and outputting one of said first input signals to said multiplier.

4. A Pade approximation convert circuit as claimed in claim 3, wherein said multiplexer outputs one of said first input signals to said multiplier according to a selective signal.

5. A Pade approximation convert circuit as claimed in claim 3, wherein the value of said first input signals is 3 or −7/3.

6. A Pade approximation convert circuit as claimed in claim 1, further comprising a multiplexer for receiving a plurality of said second input signals and outputting one of said second input signals to said divider.

7. A Pade approximation convert circuit as claimed in claim 6, wherein said multiplexer outputs one of said second input signals to said divider according to a selective signal.

8. A Pade approximation convert circuit as claimed in claim 6, wherein the value of said second input signals is 60 or 200.

9. A Pade approximation convert circuit as claimed in claim 1, further comprising a multiplexer for receiving said variable signal and said output signal, and outputting one of said variable signal and said output signal to said divider.

10. A Pade approximation convert circuit as claimed in claim 9, wherein said multiplexer outputs one of said variable signal and said output signal to said divider according to a selective signal.

11. A Pade approximation calculation convert circuit as claimed in claim 1, wherein said variable signal is a phase accumulating signal.

* * * * *